(12) United States Patent
Hong et al.

(10) Patent No.: US 9,891,656 B2
(45) Date of Patent: Feb. 13, 2018

(54) TOUCH PANEL AND METHOD FOR MANUFACTURING THE SAME

(71) Applicant: LG INNOTEK CO., LTD., Seoul (KR)

(72) Inventors: Beom Sun Hong, Seoul (KR); Ja Ram Kim, Seoul (KR); Dong Keon Lee, Seoul (KR); Jae Hong Lee, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 27 days.

(21) Appl. No.: 14/419,815

(22) PCT Filed: Apr. 2, 2013

(86) PCT No.: PCT/KR2013/002721
§ 371 (c)(1),
(2) Date: Feb. 5, 2015

(87) PCT Pub. No.: WO2014/058116
PCT Pub. Date: Apr. 17, 2014

(65) Prior Publication Data
US 2015/0212539 A1 Jul. 30, 2015

(30) Foreign Application Priority Data
Oct. 11, 2012 (KR) .................. 10-2012-0113201

(51) Int. Cl.
*G06F 3/041* (2006.01)
*G06F 3/045* (2006.01)
(Continued)

(52) U.S. Cl.
CPC .............. *G06F 1/16* (2013.01); *G06F 3/041* (2013.01); *G06F 3/044* (2013.01); *G06F 2203/04103* (2013.01)

(58) Field of Classification Search
CPC . G06F 1/16; G06F 3/044; G06F 3/041; G06F 2203/04103
(Continued)

(56) References Cited

U.S. PATENT DOCUMENTS

2003/0189554 A1    10/2003   Kawasaki et al. ............ 345/173
2005/0244722 A1*   11/2005   Okada ....................... G03F 1/32
                                                                      430/5
(Continued)

FOREIGN PATENT DOCUMENTS

CN    101452351    6/2009
CN    101490768    7/2009
(Continued)

OTHER PUBLICATIONS

International Search Report dated Aug. 12, 2013 issued in Application No. PCT/KR2013/002721.
(Continued)

Primary Examiner — Amit Chatly
(74) Attorney, Agent, or Firm — KED & Associates, LLP (57) ABSTRACT

Disclosed are a touch panel and a method for manufacturing the same. The touch panel includes a touch panel including a substrate, a sensor part on the substrate and a connection electrode connecting the sensor part, and a light absorbing layer on the substrate. The light absorbing layer is closer to the substrate rather than the connection electrode. The method includes preparing a substrate, forming a sensor part and a connection electrode on the substrate, and forming a light absorbing layer on the substrate. The light absorbing layer is closer to the substrate rather than the connection electrode.

20 Claims, 6 Drawing Sheets

(51) Int. Cl.
*G06F 1/16* (2006.01)
*G06F 3/044* (2006.01)

(58) Field of Classification Search
USPC .................................................. 345/173–175
See application file for complete search history.

(56) References Cited

U.S. PATENT DOCUMENTS

| | | | |
|---|---|---|---|
| 2009/0002338 A1 | 1/2009 | Kinoshita et al. ............ | 345/174 |
| 2010/0003502 A1 | 1/2010 | Nashiki et al. | |
| 2011/0032207 A1* | 2/2011 | Huang ................... | G06F 3/044 |
| | | | 345/174 |
| 2011/0304568 A1 | 12/2011 | Kim et al. .................... | 345/173 |
| 2012/0073866 A1 | 3/2012 | Hirai et al. | |
| 2012/0139871 A1 | 6/2012 | Ku et al. ....................... | 345/174 |
| 2013/0003182 A1* | 1/2013 | Murata ................ | G06F 3/0488 |
| | | | 359/601 |
| 2013/0038571 A1 | 2/2013 | Ho et al. | |
| 2013/0176279 A1 | 6/2013 | Chen et al. | |
| 2013/0215067 A1 | 8/2013 | Hwang et al. | |
| 2014/0041904 A1 | 2/2014 | Pedder | |

FOREIGN PATENT DOCUMENTS

| | | |
|---|---|---|
| EP | 1 351 124 A2 | 10/2003 |
| EP | 2 354 899 A2 | 8/2011 |
| KR | 10-2011-0054369 A | 5/2011 |
| TW | M432091 | 6/2012 |
| TW | M434264 | 7/2012 |
| TW | 201233272 | 8/2012 |
| WO | WO 2012/107726 | 8/2012 |

OTHER PUBLICATIONS

Chinese Office Action dated Dec. 8, 2016 issued in Application No. 201380042069.4 (English translation attached).
Taiwanese Office Action dated Feb. 10, 2017 issued in Application No. 102113983 (English translation attached).

* cited by examiner

TOUCH PANEL AND METHOD FOR MANUFACTURING THE SAME

CROSS-REFERENCE TO RELATED PATENT APPLICATIONS

This application is a U.S. National Stage Application under 35 U.S.C. §371 of PCT Application No. PCT/KR2013/002721, filed Apr. 2, 2013, which claims priority to Korean Patent Application No. 10-2012-0113201, filed Oct. 11, 2012, whose entire disclosures are hereby incorporated by reference.

TECHNICAL FIELD

The disclosure relates to a touch panel and a method for manufacturing the same.

BACKGROUND ART

Recently, a touch panel, which performs an input function through the touch of an image displayed on a display device by an input device such as a stylus pen or a hand, has been applied to various electronic appliances.

The touch panel may be representatively classified into a resistive touch panel and a capacitive touch panel. In the resistive touch panel, the position of the touch point is detected by detecting the variation of resistance according to the connection between electrodes when pressure is applied to an input device. In the capacitive touch panel, the position of the touch point is detected by detecting the variation in capacitance when a finger of the user is touched on the capacitive touch panel between electrodes. When taking of the convenience of a fabrication scheme and a sensing power, recently, the capacitive touch panel has been spotlighted in a smaller model.

The touch panel has a problem in that the pattern of a connection electrode may be seen by external incident light or light incident into an LCD provided on the touch panel.

DISCLOSURE OF INVENTION

Technical Problem

The embodiments provide a touch panel having improved visibility.

Solution to Problem

According to the embodiment, there is provided a touch panel including a substrate, a sensor part on the substrate and a connection electrode connecting the sensor part, and a light absorbing layer on the substrate. The light absorbing layer is closer to the substrate rather than the connection electrode.

According to the embodiment, there is provided a method for fabricating a touch panel. The method includes preparing a substrate, forming a sensor part and a connection electrode on the substrate, and forming a light absorbing layer on the substrate. The light absorbing layer is closer to the substrate rather than the connection electrode.

Advantageous Effects of Invention

As described above, according to the embodiment, the light absorbing layer is provided under the connection electrode of the touch panel. Accordingly, the connection electrode can be prevented from being seen by the light incident through the substrate. In other words, the light absorbing layer can minimize the reflectance of the incident light. Accordingly, the overall visibility of the connection electrode can be improved.

MODE FOR THE INVENTION

In the following description of the embodiments, it will be understood that, when a layer (film), a region, a pattern or a structure is referred to as being "on" or "under" another layer (film), region, pattern or structure, it can be "directly" or "indirectly" on the other layer (film), region, pattern or structure, or one or more intervening layers may also be present. Such a position of each layer described with reference to the drawings.

The thickness and size of each layer (film), region, pattern or structure shown in the drawings may be exaggerated, omitted or schematically drawn for the purpose of convenience or clarity. In addition, the size of each layer (film), region, pattern or structure does not utterly reflect an actual size.

Hereinafter, the embodiment will be described in detail with reference to accompanying drawings.

Figure 1:
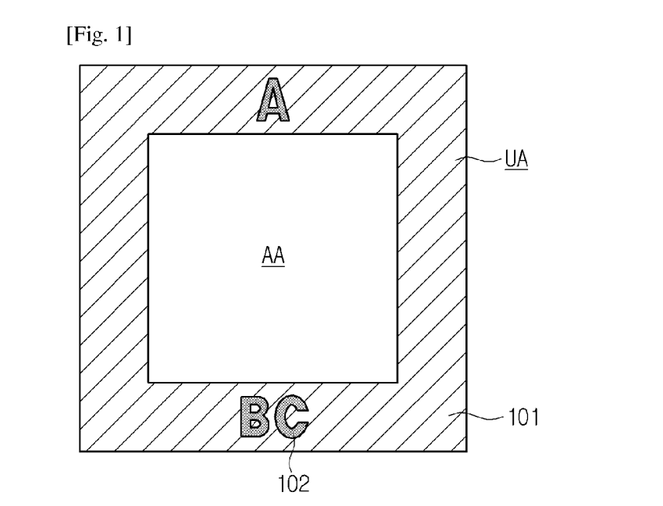
FIG. 1 is a plan view schematically showing a touch panel according to one embodiment.
Figure 2:
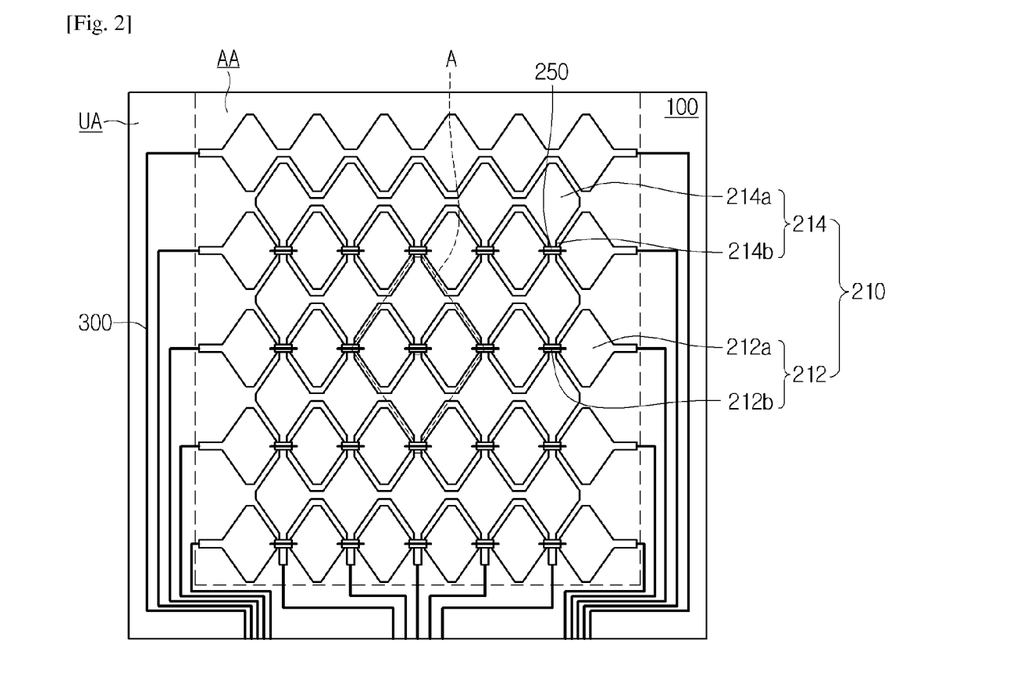
FIG. 2 is a plan view showing the touch panel according to one embodiment.
Figure 3:
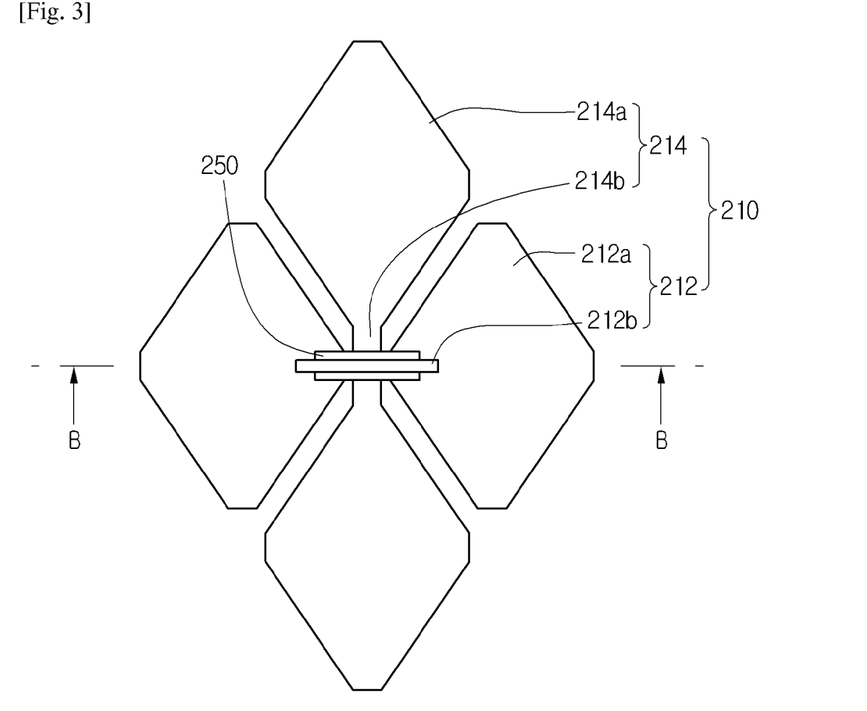
FIG. 3 is an enlarged view showing a part A of FIG. 2.
Figure 4:
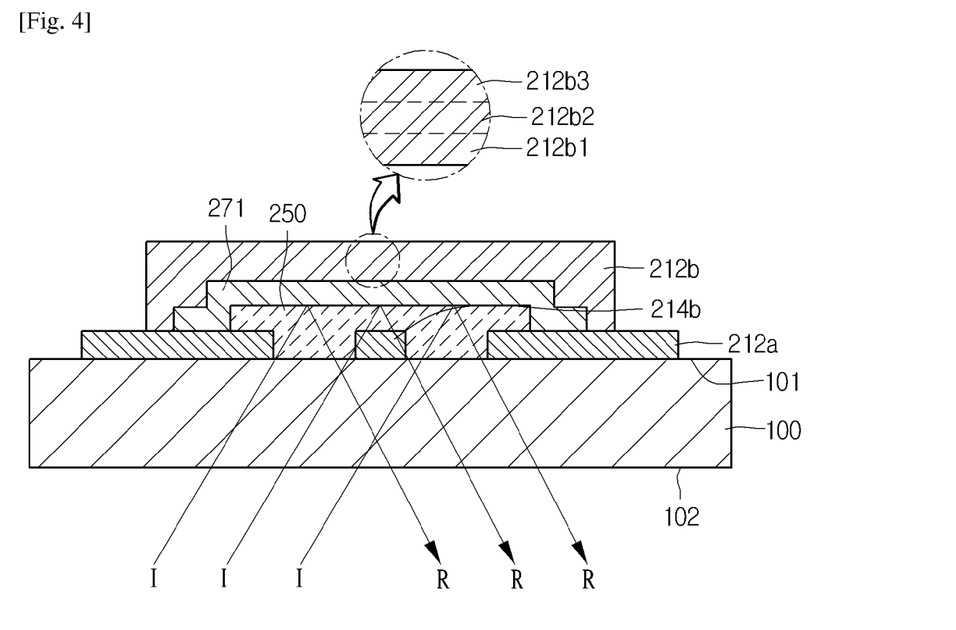
FIG. 4 is a sectional view taken along line B-B' of FIG. 3.
Figure 5:
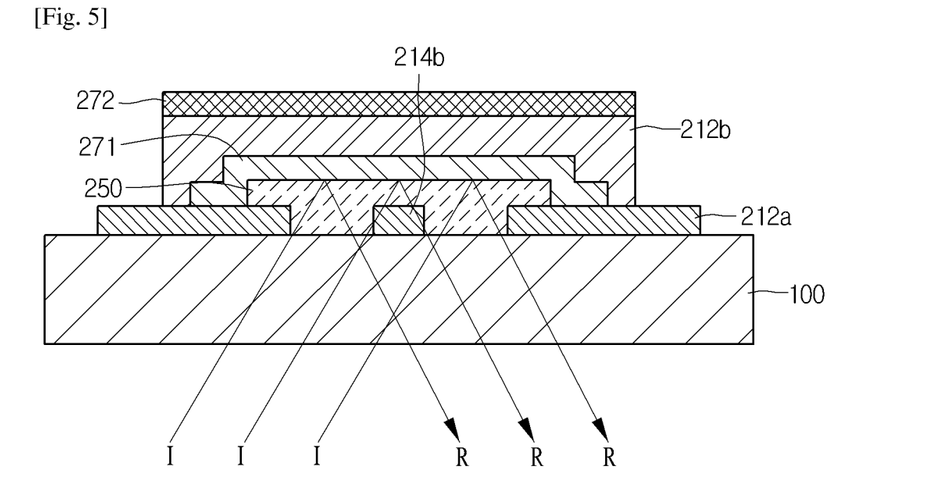
FIG. 5 is a sectional view showing a touch panel according to one embodiment.

Hereinafter, a touch panel according to one embodiment will be described in detail with reference to FIGS. 1 to 5. FIG. 1 is a plan view schematically showing a touch panel according to one embodiment. FIG. 2 is a plan view showing a touch panel according to one embodiment. FIG. 3 is an enlarged view showing a part A of FIG. 2. FIG. 4 is a sectional view taken along line B-B' of FIG. 3. FIG. 5 is a sectional view showing a touch panel according to one embodiment.

Referring to FIGS. 1 and 2, a touch panel according to the present embodiment includes a substrate 100 in which an active area AA to detect the position of an input device (e.g., finger) and an inactive area UA provided at a peripheral portion of the active area AA are defined.

In this case, the active area AA may be provided therein with a transparent electrode 210 that may sense the input device. In addition, the inactive area UA may be provided therein with wires 300 electrically connecting transparent electrodes 210 to each other. Further, the inactive area UA may be provided therein with an external circuit connected to the wires 300. The inactive area UA may be provided therein with an outer dummy layer 101, and the outer dummy layer 101 may have a logo 102.

If the input device such as the finger is touched on the touch panel, the variation of capacitance occurs in the touched part by the input device, and the touched part subject to the variation of the capacitance may be detected as a touch point.

Hereinafter, the touch panel will be described in more detail.

The substrate 100 may include various materials to support a light absorbing layer 271, the transparent electrode 210, the wires 300, and a circuit board formed on the substrate 100. For instance, the substrate 100 may include a glass substrate or a plastic substrate.

The outer dummy layer 101 is formed in the inactive area UA of the substrate 100. The outer dummy layer 101 may be coated with a material having a predetermined color so that the wires 300 and a printed circuit board connecting the wires 300 to external circuits cannot be seen from the outside. The outer dummy layer 101 may have a color suitable for a desired outer appearance thereof. For example, the outer dummy layer 101 may include black pigments to represent a black color. In addition, a desired logo 102 may be formed in the outer dummy layer 101 through various methods. The outer dummy layer 101 may be formed through a deposition, print, or wet coating scheme.

The transparent electrode 210 may be formed on the substrate 100. The transparent electrode 210 may detect whether the input device such as the finger is touched.

Referring to FIGS. 2 and 3, the transparent electrode 210 may include a first electrode 212 and a second electrode 214.

The first electrode 212 includes a plurality of first sensor parts 212a to detect whether the input device such as the finger is touched, and first connection electrode parts 212b to connect the first sensor parts 212a to each other. The first connection electrode parts 212b connect the first sensor parts 212a to each other in a first direction (X-axis direction in accompanying drawings), so that the first electrode 212 may extend in the first direction.

Similarly, the second electrode 214 includes a plurality of second sensor parts 214a to detect whether the input device such as the finger is touched, and second connection electrode parts 214b to connect the second sensor parts 214a to each other. The second connection electrode parts 214b connect the second sensor parts 214a to each other in a second direction (Y-axis direction in accompanying drawings), so that the second electrode 214 may extend in the second direction.

An insulating layer 250 may be located between the first and second connection electrode parts 212b and 214b in order to prevent the electrical short therebetween. The insulating layer 250 may include a transparent insulating material to insulate the first electrode 212 from the second electrode 214.

Referring to FIG. 3, the substrate 100 is formed thereon with the first sensor part 212a, the second sensor part 214a, and the second connection electrode part 214b, and the second connection electrode part 214b is formed thereon with the insulating layer 250. The insulating layer 250 is formed thereon with the first connection electrode part 212b connecting the first sensor parts 212a to each other.

Meanwhile, referring to FIG. 4, the first connection electrode part 212b may include at least two layers.

In detail, the first connection electrode parts 212b may include buffer layers 212b1 and 212b3 and a conductive layer 212b2. The buffer layers 212b1 and 212b3 may include the first buffer layer 212b1 and the second buffer layer 212b3. The first buffer layer 212b1 and the second buffer layer 212b3 may sandwich the conductive layer 212b2 therebetween. The first and second buffer layers 212b1 and 212b3 may be located while interposing the conductive layer 212b2 therebetween. However, the embodiment is not limited thereto, but the buffer layer may be formed in one layer structure so that the buffer layer may be located at only the upper portion or the lower portion of the conductive layer 212b2.

The buffer layers 212b1 and 212b3 may improve the adhesive strength between the first connection electrode part 212b and the substrate 100, or the adhesive strength between the first connection electrode part 212b and the first sensor part 212a. The buffer layers 212b1 and 212b3 may include conductive metal. In detail, the buffer layers 212b1 and 212b3 may be formed by depositing a material such as nickel (Ni), chrome (Cr), nickel-chrome (Ni—Cr), titanium (Ti), stannum (Sn) or molybdenum (Mo).

The conductive layer 212b2 may include conductive metal having resistance lower than that of the first sensor part 212a or the second sensor part 213a. The conductive layer 212b2 may include metal, such as Ag, Cu, Au, Mo, and Al, representing superior conductivity. Since the conductive layer 212b2 directly exerts an influence on the sensitivity of a touch screen, the deposited thickness and the deposited metal of the conductive layer 212b2 can be adjusted so that the resistance may be adjusted to 0.1Ω/□ (square) or less.

A light absorbing layer 271 is additionally provided on the substrate 100. The light absorbing layer 271 is disposed more adjacent to the substrate 100 than the first connection electrode part 212b. In other words, the light absorbing layer 271 is closer to the substrate 100 than the first connection electrode part 212b. Accordingly, the light absorbing layer 271 is interposed between the first connection electrode part 212b and the substrate 100.

Accordingly, the first connection electrode part 212b seen caused by light reflection can be prevented due to the light absorbing layer 271. In other words, the light absorbing layer 271 reflects incident light I incident into the substrate 100, thereby preventing the first connection electrode part 212b from being seen.

In particular, when a user uses the touch panel according to the embodiment, an opposite surface 102 to a surface of the substrate 100 provided thereon with the sensor part 212a, the first connection electrode part 212b, and the light absorbing layer 271 may be recognized. Accordingly, the first connection electrode part 212b is greatly affected by the incident light I incident into the opposite surface 102. According to the present embodiment, the light absorbing layer 271 is interposed between the substrate 100 and the first connection electrode part 212b, so that the visibility of the first connection electrode part 212b is reduced.

The light absorbing layer 271 may include an oxide, a nitride, or a carbide of conductive metal or the mixture thereof. In this case, the conductive metal may correspond to conductive metal constituting the buffer layers 212b1 and 212b3. Accordingly, the conductive metal may include a material such as Ni, Cr, Ni—Cr, Ti, Sn or Mo.

The light absorbing layer 271 may include conductive metal, oxygen, nitrogen, or carbon. In particular, oxygen, nitrogen, and carbon may be selectively included. In other words, when the light absorbing layer 271 includes the oxide of the conductive metal, the light absorbing layer 271 may include conductive metal and oxygen. In addition, when the light absorbing layer 271 includes the nitride of the conductive metal, the light absorbing layer 271 may include conductive metal and nitrogen. When the light absorbing layer 271 includes the carbide of the conductive metal, the light absorbing layer 271 may include conductive metal and carbon.

In the light absorbing layer 271, the conductive metal may occupy 35% to 50% of the total weight of materials constituting the light absorbing layer 271. In the light absorbing layer 271, the oxygen may occupy 30% to 40% of the total weight of materials constituting the light absorbing layer 271. In the light absorbing layer 271, the nitrogen may occupy 0% to 10% of the total weight of materials constituting the light absorbing layer 271. In the light absorbing layer 271, the carbon may occupy 0% to 5% of the total weight of materials constituting the light absorbing layer 271. The average reflectance of the light absorbing layer 271 can be adjusted according to the atom content of the conductive metal, the oxygen, the nitrogen, or the carbon and the thickness of the light absorbing layer 271. In detail, the light absorbing layer 271 may be formed through a reactive sputtering process using conductive metal, and argon (Ar), nitrogen (N2), or carbon dioxide (CO2) gas. In this case, the reflectance can be optimized by adjusting the gas volume (partial pressure ratio) used in the reactive sputtering process. Accordingly, the average reflectance can be adjusted to 5% to 10% at the wavelength band of 380 nm to 780 nm which is a visible wavelength band of the light absorbing layer 271.

Meanwhile, referring to FIG. 5, the light absorbing layers 271 and 272 may include the first light absorbing layer 271 and the second light absorbing layer 272. The first and second light absorbing layers 271 and 272 may sandwich the first connection electrode part 212b therebetween. In other words, the first and second light absorbing layers 271 and 272 may be provided while interposing the first connection electrode part 212b therebetween. The first and second light absorbing layers 272 and 272 are provided at upper and lower portions of the first connection electrode part 212b, respectively, so that light reflection can be maximized.

Thereafter, the wires 300 are formed in the inactive area UA. The wires 300 may apply the electrical signal to the transparent electrode 210. Although not shown, the light absorbing layer may be disposed on the wires 300. In detail, the light absorbing layer may be closer to the substrate than the wires 300. The light absorbing layer 271 may be disposed under the wires 300. The light absorbing layer 271 may directly make contact with the substrate 100. In addition, the light absorbing layer 271 may include the first and second light absorbing layers 271 and 272. The first and second light absorbing layers 271 and 272 may sandwich the wires 300 therebetween.

The wires 300 are formed in the inactive area UA, so that the wires 300 may not be seen.

Meanwhile, although not shown in accompanying drawings, a circuit board connected to the wires 300 may be further located. The circuit board may include various printed circuit boards. For instance, the circuit board may include a flexible printed circuit board (FPCB).

Figure 6:
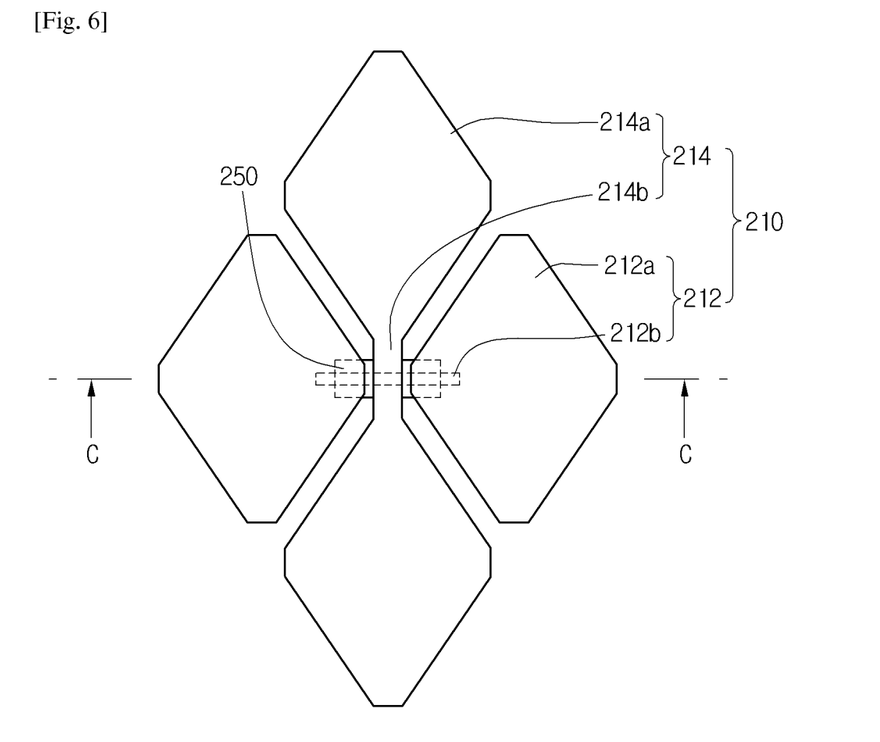
FIG. 6 is a plan view showing the touch panel according to another embodiment.
Figure 7:
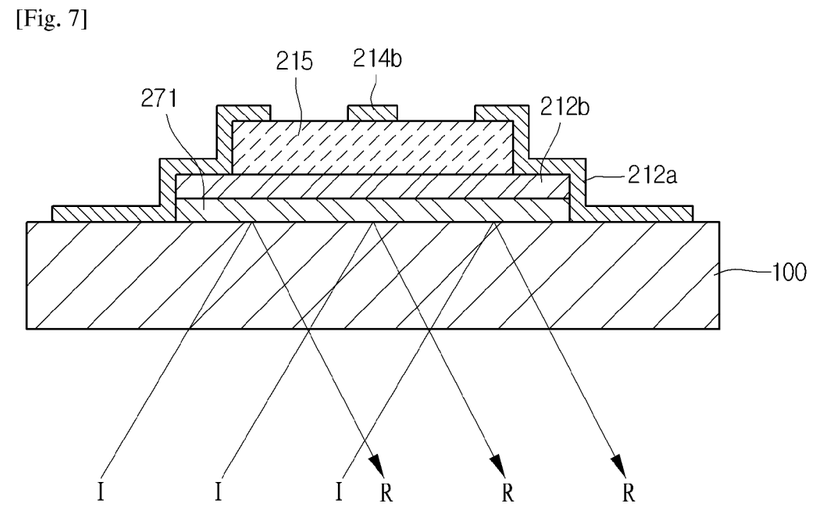
FIG. 7 is a sectional view taken along line C-C' of FIG. 6.
Figure 8:
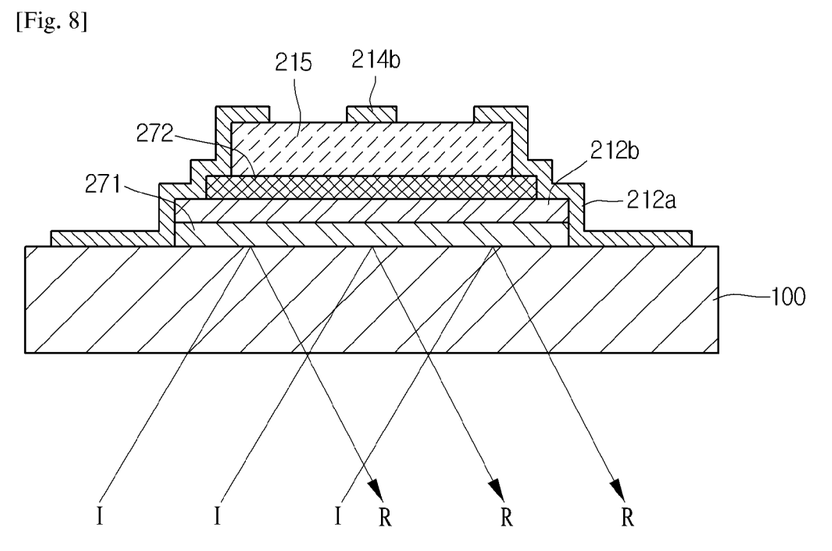
FIG. 8 is a sectional view showing a touch panel according to another embodiment.

Hereinafter, a touch panel according to another embodiment will be described in detail with reference to FIGS. 6 to 8. FIG. 6 is a plan view showing a touch panel according to another embodiment. FIG. 7 is a sectional view taken along line C-C' of FIG. 6. FIG. 8 is a sectional view showing the touch panel according to another embodiment.

Referring to FIGS. 6 and 7, the light absorbing layer 271 is located on the substrate 100. In other words, the light absorbing layer 271 directly makes contact with the substrate 100. The light absorbing layer 271 is provided thereon with the first connection electrode part 212b. The first connection electrode part 212b may be disposed on the insulating layer 250, and then the second connection electrode part 214b may be provided on the insulating layer 250. The light absorbing layer 271 directly makes contact with the substrate 100, so that the incident light incident onto the substrate 100 may be more effectively reflected. Accordingly, the visibility of the first connection electrode part 212b can be minimized.

In addition, referring to FIG. 8, the light absorbing layer 271 and 272 may include the first and second light absorbing layers 271 and 272, and the first and second light absorbing layers 271 and 272 may sandwich the first connection electrode part 212b therebetween.

Hereinafter, the embodiment will be described in more detail. However, the embodiment is provided for the illustrative purpose, and the disclosure is not limited thereto.

Embodiment 1

A sensor part was formed on a glass substrate by depositing indium tin oxide (ITO). An insulating layer was formed on the sensor part. A first light absorbing layer was formed on the insulating layer by depositing Mo, Ar, N2 and CO2 through a reactive sputtering process. Accordingly, the first light absorbing layer includes nitride and oxide. A connection electrode including a first buffer layer, a conductive layer, and a second buffer layer was formed by forming the first buffer layer including molybdenum (Mo), the conductive layer including silver (Ag), and the second buffer layer including Mo on the first light absorbing layer.

Embodiment 2

A touch panel according to the second embodiment was manufactured in the same scheme as that of the first embodiment except that a second light absorbing layer was additionally formed in the same scheme as the scheme of forming the first light absorbing layer on the connection electrode.

Comparative Example

A touch panel according to the comparative example was manufactured in the same scheme as that of the first embodiment except that the first light absorbing layer was not formed.

Figure 9:
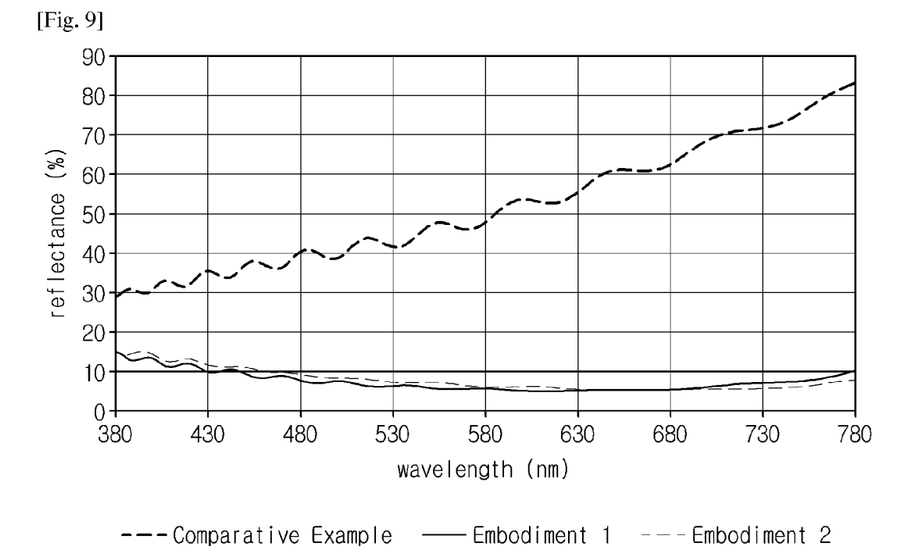
FIG. 9 is a graph showing a reflective index as a function of a wavelength according to a comparative example, a first embodiment, and a second embodiment.
Figure 10:
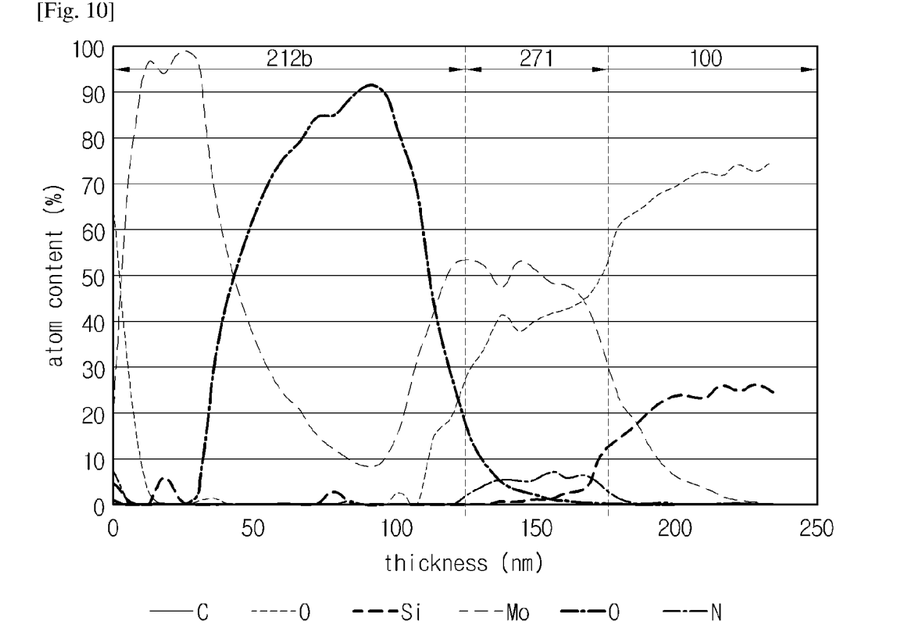
FIG. 10 is a graph showing an atom content as a function of a thickness according to the first embodiment.
Figure 11:
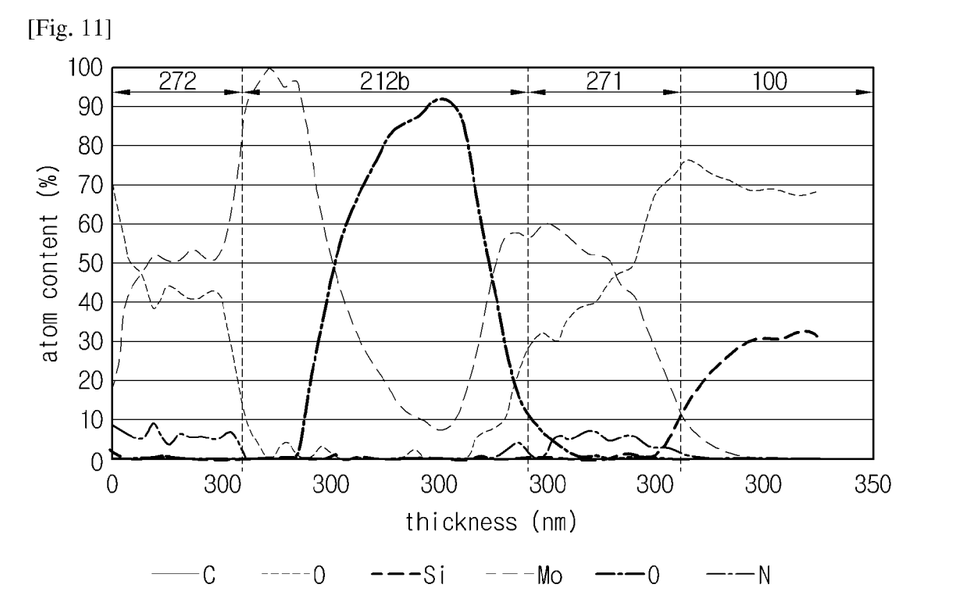
FIG. 11 is a graph showing an atom content as a function of a thickness according to the second embodiment.

Referring to FIG. 9, in the case of the comparative example, about 52% of the average reflectance was represented at the wavelength band of 380 nm to 780 nm which is a visible wavelength band. Meanwhile, in the case of the first and second embodiments, about 7.4% and about 7.9% of the average reflectance was represented in the visible wavelength band, which was lower than the average reflectance of the comparative example Meanwhile, FIG. 10 is a graph showing an atom content as a function of the thickness according to the first embodiment. FIG. 11 is a graph showing an atom content as a function of the thickness according to the second embodiment. As the atom contents of the first and second embodiments satisfy the graphs FIGS. 10 and 11, the above lower reflectance can be obtained.

The features, structures, and effects described in the above embodiments are included in at least one embodiment of the present invention, and are not necessarily limited to only one embodiment. Moreover, the features, structures, and effects described in the embodiments may also be combined or modified to be carried out in other embodiments by those skilled in the art to which the embodiments pertain. Thus, the contents related to the combination and modification shall be construed to be included in the scope of the present invention.

Further, although the embodiments have been mainly described until now, they are just exemplary and do not limit the present invention. Thus, those skilled in the art to which the present invention pertains will know that various modifications and applications which have not been exemplified may be carried out within a range which does not deviate from the essential characteristics of the embodiments. For example, the constituent elements described in detail in the exemplary embodiments can be modified to be carried out. Further, the differences related to such modifications and applications shall be construed to be included in the scope of the present invention specified in the attached claims.

The invention claimed is:

1. A touch panel comprising: a substrate; a sensor part including a first sensor part and a second sensor part on the substrate; a connection electrode including a first connection electrode connecting the first sensor part, and a second connection electrode connecting the second sensor part; a light absorbing layer on the substrate; and an insulating layer disposed between the first connection electrode and the second connection electrode, wherein the first sensor part is extended in a first direction, and the second sensor part is extended in a second direction, wherein the first sensor part and the second sensor part are formed on the same plane, wherein the light absorbing layer includes a first light absorbing layer and a second light absorbing layer, wherein the first connection electrode is provided between the first light absorbing layer and the second light absorbing layer, wherein the first connection electrode directly contacts the first light absorbing layer and the second light absorbing layer, wherein the light absorbing layer includes a conductive metal, wherein the conductive metal occupies 35% to 50% with respect to whole materials constituting the light absorbing layer, and wherein the light absorbing layer includes the conductive metal containing Mo and the concentration of Mo is under 60%.

2. The touch panel of claim 1, wherein the first light absorbing layer is disposed under the connection electrode, and the second light absorbing layer is disposed on the connection electrode.

3. The touch panel of claim 2, wherein the first and second light absorbing layers sandwich the connection electrode therebetween.

4. The touch panel of claim 1, wherein the light absorbing layer includes one selected from the group consisting of an oxide, a nitride, and a carbide of conductive metal, and the mixture thereof.

5. The touch panel of claim 1, wherein the light absorbing layer includes one selected from the group consisting of oxygen, nitrogen, and carbon.

6. The touch panel of claim 5, wherein the oxygen occupies 30% to 40% with respect to whole materials constituting the light absorbing layer.

7. The touch panel of claim 5, wherein the nitrogen occupies 0% to 10% with respect to whole materials constituting the light absorbing layer.

8. The touch panel of claim 5, wherein the carbon occupies 0% to 5% with respect to whole materials constituting the light absorbing layer.

9. The touch panel of claim 1, wherein the light absorbing layer directly contacts the substrate.

10. The touch panel of claim 1, wherein the connection electrode includes a buffer layer and a conductive layer.

11. The touch panel of claim 10, wherein the buffer layer includes conductive material.

12. The touch panel of claim 10, wherein the buffer layer includes one selected from the group consisting of nickel (Ni), chrome (Cr), nickel-chrome (Ni—Cr), titanium (Ti), stannum (Sn), and molybdenum (Mo).

13. The touch panel of claim 10, wherein the buffer layer comprises first and second buffer layers.

14. The touch panel of claim 13, wherein the first and second buffer layers sandwich the conductive layer therebetween.

15. The touch panel of claim 10, wherein the conductive layer includes one selected from the group consisting of Ag, Cu, Au, Mo, and Al.

16. The touch panel of claim 1, further comprising a wire electrically connecting the sensor part, wherein the light absorbing layer is provided over the wire and closer to the substrate than the wire.

17. A touch panel comprising: a substrate; a transparent electrode including a first electrode and a second electrode on the substrate, wherein the first electrode includes a plurality of first sensor parts and first connection electrode parts to connect the first sensor parts to each other, wherein the second electrode includes a plurality of second sensor parts and second connection electrode parts to connect the second sensor parts to each other, wherein the first and the second sensor parts are formed on the same plane; and an insulating layer disposed between the first connection electrode parts and the second connection electrode parts; and a light absorbing layer on the substrate, wherein the light absorbing layer includes a first light absorbing layer and a second light absorbing layer, wherein the first connection electrode is provided between the first light absorbing layer and the second light absorbing layer, wherein the first connection electrode directly contacts the first light absorbing layer and the second light absorbing layer, wherein the light absorbing layer includes a conductive metal, wherein the conductive metal occupies 35% to 50% with respect to whole materials constituting the light absorbing layer, and wherein the light absorbing layer includes the conductive metal containing Mo and the concentration of Mo is under 60%.

18. The touch panel of claim 17, wherein an average reflectance is 5% to 10% at the wavelength band of 380 nm to 780 nm.

19. The touch panel of claim 17, wherein the concentration of the Mo decreases from the light absorbing layer toward the substrate.

20. The touch panel of claim 1, wherein an average reflectance is 5% to 10% at the wavelength band of 380 nm to 780 nm.

* * * * *